US009339877B2

United States Patent
Lin (10) Patent No.: US 9,339,877 B2
(45) Date of Patent: May 17, 2016

(54) ELECTRIC MITRE SAW (75) Inventor: Youyu Lin, Nanjing (CN)

(73) Assignee: SUMEC HARDWARE & TOOLS CO., LTD., Nanjing (CN)

( * ) Notice: Subject to any disclaimer, the term of this patent is extended or adjusted under 35 U.S.C. 154(b) by 149 days.

(21) Appl. No.: 14/376,059

(22) PCT Filed: Sep. 7, 2012

(86) PCT No.: PCT/CN2012/081111
§ 371 (c)(1),
(2), (4) Date: Jul. 31, 2014

(87) PCT Pub. No.: WO2014/005372
PCT Pub. Date: Jan. 9, 2014

(65) Prior Publication Data
US 2014/0366697 A1    Dec. 18, 2014

(30) Foreign Application Priority Data

Jul. 4, 2012    (CN) .......................... 2012 1 0228955
Aug. 31, 2012   (CN) .......................... 2012 1 0317700

(51) Int. Cl.
*B23D 47/02*    (2006.01)
*B23B 45/04*    (2006.01)
(Continued)

(52) U.S. Cl.
CPC .............. *B23D 47/02* (2013.01); *B23B 45/048* (2013.01); *B23D 45/14* (2013.01); *B27B 5/208* (2013.01); *Y10T 83/7697* (2015.04)

(58) Field of Classification Search
CPC ...... B23D 47/02; B23D 45/14; B23D 45/048; B27B 5/208; Y10T 83/7697
USPC .......................................................... 83/471.3
See application file for complete search history.

(56) References Cited

U.S. PATENT DOCUMENTS 5,054,352 A * 10/1991 Fushiya ............... B23D 45/044
                                                83/468.3
5,239,906 A    8/1993  Garuglieri
(Continued)

FOREIGN PATENT DOCUMENTS

CN    02138582.3    10/2002
CN    1493426 A     5/2004
(Continued)

*Primary Examiner* — Sean Michalski
(74) *Attorney, Agent, or Firm* — Muncy, Geissler, Olds & Lowe, P.C.

(57) ABSTRACT

Disclosed is an electric mitre saw, comprising a base (1), a work bench (2), a saw mechanism, and a swing arm (4), wherein a plurality of layers of slide rails (5, 11) extending in a horizontal direction are provided on the swing arm (4), with the plurality of layers of slide rails (5, 11) being able to slide horizontally relative to each other by means of a slide block (6), a rotary shaft (10) is provided on one layer of the slide rails (11) farthest away from the swing arm (4), and the saw mechanism is rotatably connected to the rotary shaft (10). By means of the arrangement of the plurality of layers of slide rails (5, 11), the length of each layer of slide rails is relatively short, the manufacturing difficulty is reduced, there is a saving in the working space of the miter saw, and the packaging volume is reduced. When one layer of slide rails (5, 11) is respectively arranged at both sides of a saw blade (15), the end parts of two slide rails of each layer of slide rails (5, 11) are able to be connected by a connecting seat (8, 14), thus facilitating the improvement of parallelism of the two slide rails (5, 11), and providing a greater cutting travel. A gripping space is also formed between the two layers of slide rails (5, 11), such that observation during cutting is convenient.

14 Claims, 6 Drawing Sheets (51) Int. Cl.
*B23D 45/14* (2006.01)
*B27B 5/20* (2006.01)

(56) References Cited

U.S. PATENT DOCUMENTS

| | | | | |
|---|---|---|---|---|
| 5,241,888 A * | 9/1993 | Chen | B23D 45/046 | 83/471.3 |
| 5,421,228 A * | 6/1995 | Fukinuki | B23D 45/024 | 83/471.3 |
| 5,870,939 A * | 2/1999 | Matsubara | B23D 45/048 | 83/471.3 |
| 6,016,732 A * | 1/2000 | Brault | B23D 45/048 | 83/471.3 |
| D454,577 S * | 3/2002 | Meredith | B23D 45/048 | D15/133 |
| 6,532,853 B1 * | 3/2003 | Kakimoto | B23D 45/044 | 83/471.3 |
| 6,550,363 B2 * | 4/2003 | He | B23D 45/048 | 83/471.3 |
| 6,886,440 B2 * | 5/2005 | Parks | B23D 45/046 | 83/471.3 |
| 6,901,834 B2 * | 6/2005 | Chang | B23D 45/048 | 83/471.3 |
| 6,988,435 B2 * | 1/2006 | Kao | B23D 45/048 | 83/100 |
| 6,997,091 B1 * | 2/2006 | Shibata | B23D 45/048 | 83/399 |
| D531,195 S * | 10/2006 | Waldron | B23D 45/048 | D15/133 |
| 8,060,235 B2 * | 11/2011 | Johnson | B23D 45/044 | 30/166.3 |
| 8,161,858 B2 * | 4/2012 | Aoyama | B23D 45/048 | 83/471.2 |
| 8,522,656 B2 * | 9/2013 | Kani | B27B 5/29 | 83/471.3 |
| 2003/0226436 A1 * | 12/2003 | Higuchi | B23D 45/027 | 83/471.3 |
| 2005/0066788 A1 | 3/2005 | Chang | | |
| 2006/0042442 A1 * | 3/2006 | Ushiwata | B23D 45/027 | 83/473 |
| 2006/0042444 A1 * | 3/2006 | Ushiwata | B23D 59/003 | 83/581 |
| 2006/0266190 A1 * | 11/2006 | Saitou | B23D 45/044 | 83/581 |
| 2009/0173200 A1 * | 7/2009 | Aoyama | B23D 45/048 | 83/471.3 |
| 2011/0041665 A1 * | 2/2011 | Ushiwata | B23D 45/027 | 83/471.3 |
| 2011/0314989 A1 * | 12/2011 | Xu | B23D 45/048 | 83/471.3 |
| 2012/0222535 A1 * | 9/2012 | Imamura | B23D 45/048 | 83/471.3 |
| 2013/0133495 A1 * | 5/2013 | Imamura | B23D 47/02 | 83/471.3 |

FOREIGN PATENT DOCUMENTS

| | | |
|---|---|---|
| CN | 200410044804.8 | 5/2004 |
| CN | 1579690 A | 2/2005 |
| CN | 100415425 C | 9/2008 |
| CN | 101537637 A | 9/2009 |
| EP | 0379322 | 7/1990 |
| JP | 2008-44034 | 2/2008 |
| WO | WO 03/035314 A1 | 5/2003 |

* cited by examiner

ELECTRIC MITRE SAW

BACKGROUND OF THE INVENTION

1. Field of the Invention

The present invention relates to miter saw technology, and more particularly to a sliding type electric mitre saw.

2. Description of the Related Art

For the advantage of being capable of making a quick, accurate, wide crosscut in a workpiece at a selected angle, sliding type miter saws have been widely used in various fields. In the prior art, most sliding type miter saws have a swinging arm mounted at a rear side of the worktable, at least one sliding rail slidably mounted at the swinging arm, and a sawing mechanism fixedly mounted at one end of the sliding rail, thereby providing a sliding cutting function. During operation of a sliding type miter saw of this design, the at least one sliding rail will extend backward, and therefore the sliding type miter saw requires a large working space. Further, a sliding type miter saw of this design has the drawbacks of large packing dimension and high delivery cost. U.S. Pat. No. 5,239,906 (CN200410044804.8) discloses a circular saw arrangement that has a table arrangement which provides a support area for the workpiece to be cut, and a saw unit provided for chop-saw and rip-saw cutting. According to this design, elongate guide rods are supported in a cantilevered manner by a vertical support member connected to the table arrangement, and the saw unit is slidably carried on the elongate guide rods for rip-saw cutting; further, the vertical support is pivotally supported by the table arrangement to provide for miter cutting. When compared with the aforesaid prior art design, U.S. Pat. No. 5,239,906 effectively reduces the working space requirement and the packing dimension. However, due to a single layer sliding rail arrangement, the sliding stroke is limited. Further, the demand for the structural strength and manufacturing precision of the elongated guide rods is high. EP0379322B1 discloses another design of sliding type miter saw. According to this design, a guide bar is horizontally movably located above the table, and an arm is pivotably mounted to an end of the guide bar. Thus, the cutting tool located above the turn table is vertically swung with the arm, or is horizontally moved to carry out various cutting operations with respect to the workpiece placed on the base. However, this design of sliding type miter saw still requires a large working space and has a large packing dimension. Further, Chinese patent CN02138582.3 discloses a cutting machine that has a steering mechanism and a recess hole provided below the sawing arm. This design fully utilizes the space above the base, however, the sliding rail will extend out of the base to a long distance during the operation.

SUMMARY OF THE INVENTION

The present invention has been accomplished under the circumstances in view. It is the main object of the present invention to provide a electric mitre saw, which has the advantages of compact structure, long cutting stroke, sliding stroke adjustability, working space saving and ease of fabrication.

To achieve this and other objects of the present invention, the invention provides a electric mitre saw that comprises:

a base;

a worktable rotatably connected to the base;

a saw unit disposed above the worktable and movable forward and backward relative to the worktable, the saw unit comprising a motor, a saw blade rotatable by the motor, and a motor mount;

a swing arm pivotally mounted at a rear side of the worktable;

wherein the swinging arm guide rod means mounted therein, the guide rod means comprising multiple layers of guide rods respectively horizontally movable forward and backward relative to the swinging arm, each of two adjacent the layers of guide rods being coupled together by a sliding block and movable relative to each other, the farthest layer of guide rods remote from the swinging arm has a rotating shaft mounted therein; the saw unit is pivotally connected to the rotating shaft.

Further, the guide rod means comprises at least one first-layer guide rod horizontally mounted in the swinging arm, a sliding block slidably coupled to the at least one first-layer guide rod and lockable thereto, and at least one second-layer guide rod horizontally coupled to the sliding block.

Further, the second-layer guide rods are horizontally slidably coupled to the sliding block and lockable thereto.

Further, the rotating shaft is slidably mounted at the at least one second-layer guide rod, or fixedly mounted at one end of the at least one second-layer guide rod.

Further, the guide rod amount of each layer of the guide rod means can be 1, 2 or more than 2.

Preferably, the guide rod amount of each layer of the guide rod means is 2, and the center lines of the two guide rods of each layer of the guide rod means are linear guide rods are disposed in parallel and define therebetween a space for the movement of the saw blade.

Preferably, the guide rod means comprises at least one first-layer guide rod horizontally mounted in the swinging arm at one lateral side relative to the saw blade, a sliding block slidably coupled to the at least one first-layer guide rod and lockable thereto, at least one second-layer guide rod horizontally coupled to the sliding block at an opposite lateral side relative to the saw blade and in a parallel manner relative to the at least one first-layer guide rod; the rotating shaft is mounted at the at least one second-layer guide rod; the saw unit is pivotally connected to the rotating shaft; the at least one first-layer guide rod and the at least one second-layer guide rod define therebetween a space for the passing of the saw blade.

Preferably, the at least one first-layer guide rod is fixedly mounted at the swinging arm and disposed at one lateral side relative to the saw blade.

Preferably, the at least one first-layer guide rod is slidably mounted at the swinging arm and disposed at one lateral side relative to the saw blade.

Further, the sliding block can be slidably mounted at least one first-layer guide rod. Alternatively, the sliding block can be fixedly mounted at one end of the at least one first-layer guide rod.

Further, the at least one second-layer guide rod can be fixedly mounted at the swinging arm and disposed at an opposite lateral side relative to the saw blade; the rotating shaft can be pivotally mounted at the at least one second-layer guide rod; the saw unit is slidable relative to the at least one second-layer guide rod.

Further, the at least one second-layer guide rod can be slidably mounted at the swinging arm and disposed at an opposite lateral side relative to the saw blade; the rotating shaft can be affixed or slidably coupled to the at least one second-layer guide rod, enabling the saw unit to be moved with the at least one second-layer guide rod relative to the sliding block or moved relative to the at least one second-layer guide rod.

Further, the guide rod amount of each layer of the guide rod means is selectively 1, 2 or more than 2.

Preferably, the guide rod amount of the at least one first-layer guide rod is 2, and the plane on the center lines of the two the first-layer guide rods defines with the saw blade a predetermined angle.

Preferably, the guide rod amount of the at least one second-layer guide rod is 2, and the plane on the center lines of the two the second-layer guide rods defines with the saw blade a predetermined angle.

Preferably, the guide rod amount of the at least one first-layer guide rod and the guide rod amount of the at least one second-layer guide rod are 2; the two first-layer guide rods have respective rear ends thereof connected together with a respective connection member; the two the second-layer guide rods have respective rear ends thereof connected together with a respective connection member.

Further, the plane on the at least one first-layer guide rod and the plane on the at least one second-layer guide rod are disposed in an asymmetric manner relative to the saw blade.

Preferably, the guide rod amount of the at least one first-layer guide rod and the guide rod amount of the at least one second-layer guide rod are 2; the plane on the center lines of the two first-layer guide rods and the plane on the center lines of the two second-layer guide rods define therebetween a V-shaped open space, the V-shaped open space having a relatively larger top side facing toward the saw unit for the passing of the motor mount and the saw blade and a relatively smaller bottom side facing toward the worktable for the passing of the saw blade.

Further, the swinging arm, the sliding block and the rotating shaft are respectively provided with a respective lock means for locking.

Further, each lock means can be a lock screw. The lock screw has one end thereof tightly stoppable against one guide rod.

Further, each lock means can be a lock pin selectively insertable into one of a series of holes at one side guide rod.

Further, the guide rods of the multiple layers of guide rods are selectively made in equal length or different lengths.

Preferably, the guide rods of the multiple layers of guide rods are round rods.

Further, the guide rods of the multiple layers of guide rods can be linear guide rods having notches or protrusions.

Preferably, the at least one second-layer guide rod is disposed above the elevation of the at least one first-layer guide rod. Other advantages and features of the present invention will be fully understood by reference to the following specification in conjunction with the accompanying drawings, in which like reference signs denote like components of structure.

Thus, the invention has the benefits as outlined hereinafter:

1. The electric mitre saw of the present invention has multiple layers of guide rods arranged between the saw unit and the worktable, and thus the length of the guide rods can be greatly shortened to achieve the same cutting stroke when compared with the prior art designs, and thus the fabrication difficulty level can be relatively lowered.

2. The multiple layers of guide rods can be respectively locked in different positions so that the user can set the sliding stroke subject to the workpiece cutting width, facilitating operation and enhancing the working efficiency.

3. When the saw unit is moved back to the swinging arm, the guide rods will not extend out of the rear side of the swinging arm, or the extended distance of the guide rods out of the rear side of the swinging arm is limited, at this time, the working space of the electric mitre saw is greatly reduced, reducing the packing dimension of the electric mitre saw and its transportation cost.

4. If two layers of guide rods are respectively arranged at two opposite lateral sides relative to the saw blade, the guide rods do not interfere with the cutting operation of the saw blade; a connection member is connected between the two guide rods of each layer to limit the sliding of the sliding block and to increase the parallelity of the guide rods, and thus, the guide rods can be made relatively longer to provide a relatively larger cutting stroke.

5. If two layers of guide rods are respectively arranged at two opposite lateral sides relative to the saw blade, the planes on the two layers of guide rods define therebetween a V-shaped open space that has a relatively larger top side facing toward the saw unit for the passing of the motor mount and the saw blade and a relatively smaller bottom side facing toward the worktable for the passing of the saw blade, and thus, a wide viewing angle is provided, facilitating viewing the cutting operation.

DETAILED DESCRIPTION OF THE INVENTION

Figure 1:
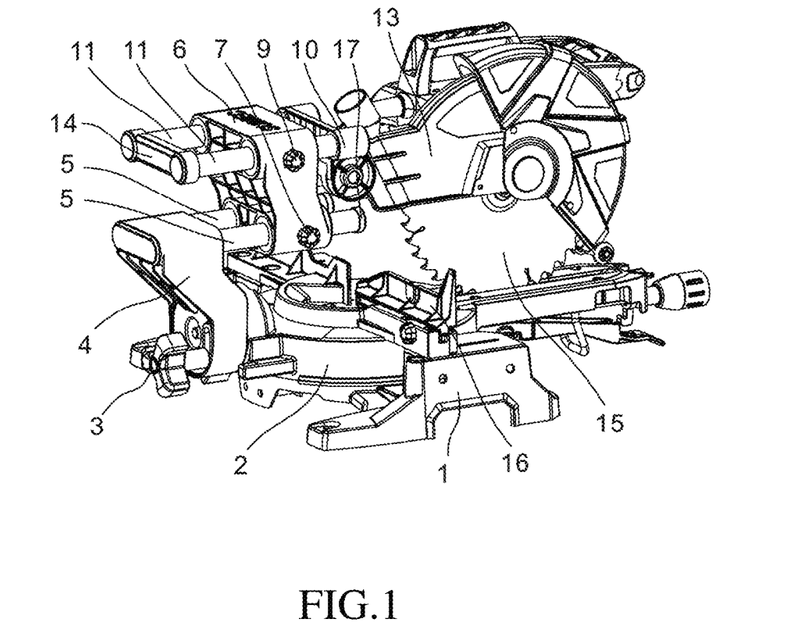
FIG. 1 is an oblique top elevational view of a electric mitre saw in accordance with a first embodiment of the present invention.
Figure 2:
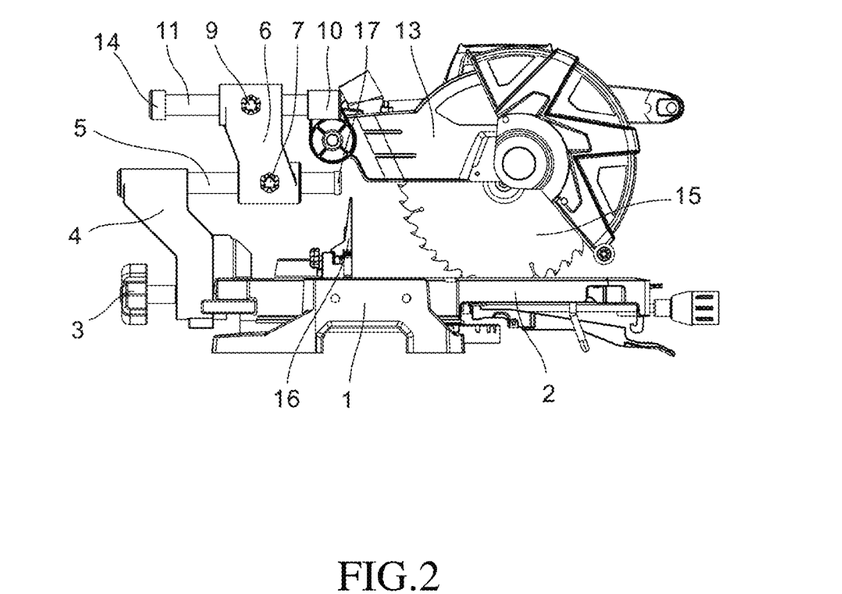
FIG. 2 is a front view of the electric mitre saw in accordance with the first embodiment of the present invention.
Figure 3:
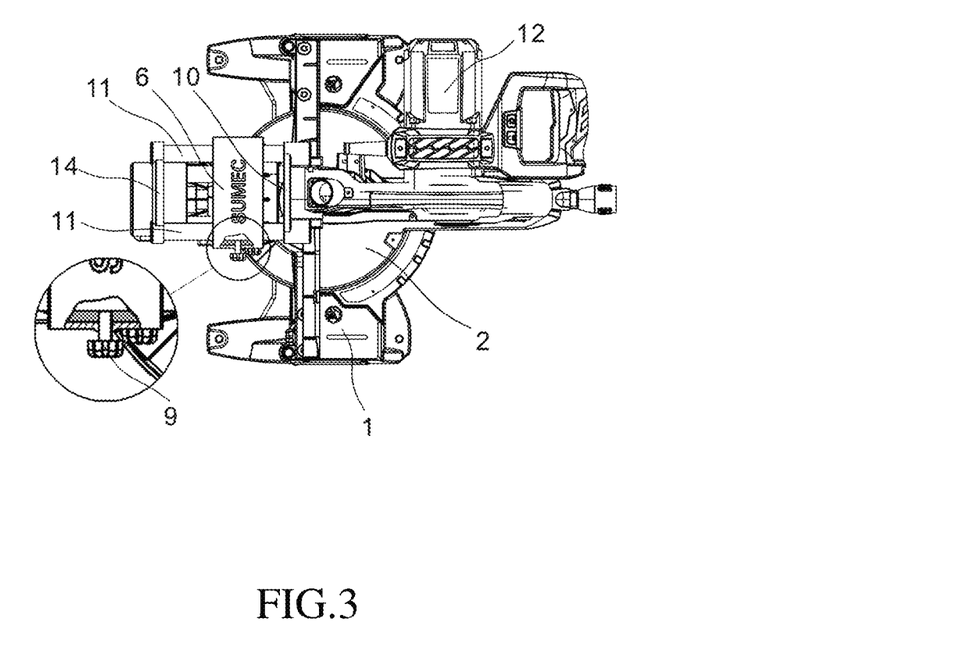
FIG. 3 is a top view of a partial sectional view of FIG. 2.

Referring to FIGS. 1, 2 and 3, a electric mitre saw in accordance with a first embodiment of the present invention is shown. According to this first embodiment, the electric mitre saw comprises a base 1, a fence 16 mounted at the base 1 for supporting the workpiece to be cut, a worktable 2 rotatably coupled to the base 1, a swinging arm 4 pivotally mounted at a rear side of the worktable 2, an arm locking knob 3 located at a rear side of the swinging arm 4 and adapted for locking the swinging arm 4 to the worktable 2 at a selected angle, at least one, for example, two first-layer guide rods 5 mounted in and horizontally extended out of the swinging arm 4, a sliding block 6 mounted on and movable along the first-layer guide rods 5, at least one, for example, two second-layer guide rods 11 slidably mounted in the sliding block 6 in parallel to the first-layer guide rods 5, a rotating shaft 10 fixedly mounted at one end of the second-layer guide rods 11, and a saw unit pivotally connected to the rotating shaft 10.

The saw unit comprises a motor mount 13, a motor 12 and a saw blade 15. By means of the motor mount 13, the saw unit is turnably connected to one end of the first-layer guide rods 5 remote from the swinging arm 4.

The plane of the center lines (central axes) of the first-layer guide rods 5 is kept in parallel to the plane of the center lines (central axes) of the second-layer guide rods 11. The space between the first-layer guide rods 5 and the second-layer guide rods 11 allows movement of the saw blade 15. A position-limit member 17 is located at a front end of each of the first-layer guide rods 5 and second-layer guide rods 11 to prohibit the sliding block 6 or rotating shaft 10 from falling out of the respective guide rods during movement. A connection member is mounted at opposing rear ends of the first-layer guide rods 5 or second-layer guide rods 11 without interfering with the sliding movement of the saw blade, for example, the connection member 14 connected between the rear ends of the first-layer guide rods 5. Preferably, the plane on the center lines of the first-layer guide rods 5 and the plane on the second-layer guide rods 11 are kept in parallel and in a perpendicular manner relative to the saw blade 15.

Further, in this embodiment, the sliding block 6 and rotating shaft 10 are respectively pivotally mounted at the respective guide rods, and a respective locking member is provided for locking the sliding block 6 or rotating shaft 10 to the respective guide rods. For example, a first-layer locking member 7 and a second-layer lock 9 are provided at the sliding block 6 for locking the sliding block 6 to the first-layer guide rods 5 and the second-layer guide rods 11. As illustrated in FIG. 3, by means of fastening tight the first-layer locking member 7 and the second-layer lock 9, the user can set the suitable sliding stroke subject to the workpiece cutting width. Thus, the user can rapidly and accurately set the sliding stroke of the electric mitre saw to fit different cutting width requirements, enhancing the working efficiency. Preferably, lock screws are used for the first-layer locking member 7 and the second-layer lock 9. Alternatively lock pins can be used for the first-layer locking member 7 and the second-layer lock 9 and selectively insertable into longitudinally spaced holes at the respective guide rods.

In this embodiment, the first-layer and second-layer guide rods are selected from the group of round rods, linear guide rods, linear guideways with notches or protrusions, and linear tracks.

Figure 4:
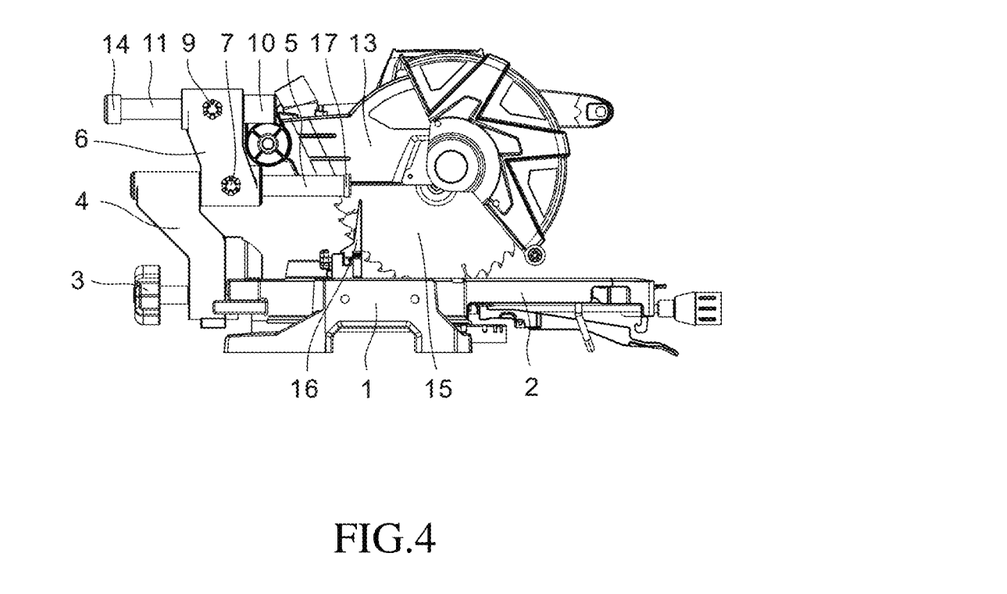
FIG. 4 corresponds to FIG. 2, illustrating the electric mitre saw on the minimum sliding stroke status.

Referring to FIG. 4, when the first-layer guide rods 5 and the second-layer guide rods 11 of the electric mitre saw are arranged to provide the minimum sliding stroke, the electric mitre saw requires less working space and its packing dimension is minimized.

Figure 5:
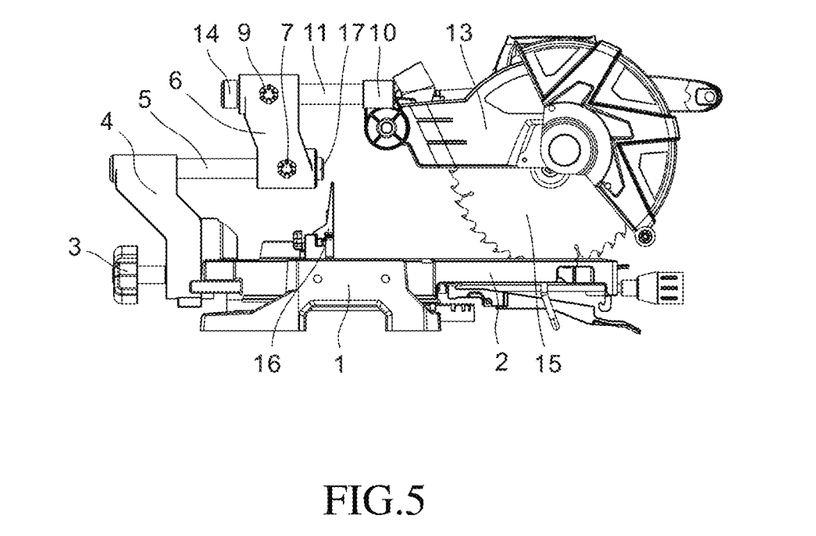
FIG. 5 corresponds to FIG. 2, illustrating the electric mitre saw on the maximum sliding stroke status.
Figure 6:
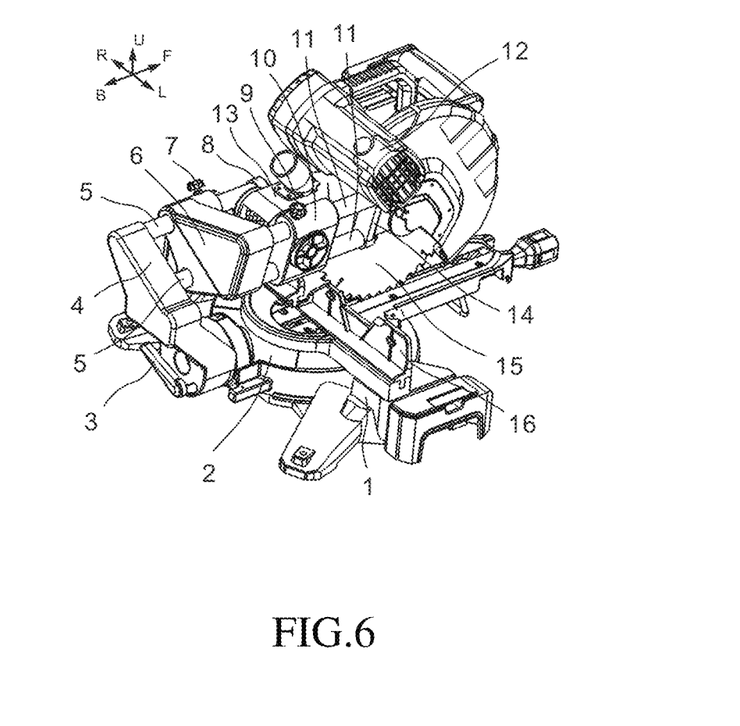
FIG. 6 is an oblique top elevational view of a electric mitre saw in accordance with a second embodiment of the present invention.

Referring to FIG. 5, when the first-layer guide rods 5 and the second-layer guide rods 11 of the electric mitre saw are arranged to provide the maximum sliding stroke, the electric mitre saw has a large sliding stroke. According to the present invention, the length of each layer of guide rods can be minimized, lowering the level of difficulty of the fabrication of the electric mitre saw.

In the aforesaid first embodiment of the present invention, two layers of guide rods are provided. However, to an ordinary person skilled in the art, it is obvious to increase the design of the guide rods to three layers or more than three layers without departing from the spirit and scope of the present invention. Further, each two adjacent layers of guide rods can be coupled together with one sliding block; each sliding block can be moved relative to each layer of guide rods; locking means is provided for locking each sliding block to the respective guide rods; the rotating shaft 10 is mounted at the layer of guide rods farthest from the swinging arm 4.

Similarly, when three or more than three layers of guide rods are used, a respective position-limit member 17 is located at a front end of each of the guide rods.

Referring to FIGS. 6-9, a electric mitre saw in accordance with a second embodiment of the present invention is shown. According to this second embodiment, the electric mitre saw comprises a base 1, a fence 16 mounted at the base 1 for supporting the workpiece to be cut, a worktable 2 rotatably coupled to the base 1, a swinging arm 4 pivotally mounted at a rear side of the worktable 2, an arm locking knob 3 located at a rear side of the swinging arm 4 and adapted for locking the swinging arm 4 to the worktable 2 at a selected angle, at least one first-layer guide rod 5 mounted in the swinging arm 4 and horizontally extended out of the swinging arm 4 in a forward direction F, a sliding block 6 mounted on and movable along the at least one first-layer guide rod 5, at least one second-layer guide rod 11 slidably mounted in the sliding block 6 in parallel to the at least one first-layer guide rod 5, a rotating shaft 10 horizontally mounted on and movable along the second-layer guide rods 11, and a saw unit pivotally connected to the rotating shaft 10 and movable with the rotating shaft 10 along the at least one second-layer guide rod 11.

Preferably, each of the at least one first-layer guide rod 5 and the at least one second-layer guide rod 11 consists of two linear guide rods arranged in parallel. Further, the guide rods can be made having the same length. Alternatively, the guide rods can be made having different lengths. The axial direction of the guide rods is the moving direction of the workpiece during working of the electric mitre saw. Preferably, the two first-layer guide rods 5 have the same length; the two second-layer guide rods 11 have the same length.

Further, a first-layer locking member 7 and a second-layer lock 9 are provided at the sliding block 6 and the rotating shaft 10 for locking the sliding block 6 to the first-layer guide rods 5 and the second-layer guide rods 11.

As illustrated, the two second-layer guide rods 11 in the sliding block 6 can be made movable relative to each other. Alternatively, the two second-layer guide rods 11 can be fixedly connected together. Preferably, the rear ends of the two second-layer guide rods 11 are fixedly connected to the sliding block 6, and the opposing front ends of the two second-layer guide rods 11 suspend above the workable 2.

The saw unit comprises a motor 12, a saw blade 15, and a motor mount 13 pivotally mounted at the rotating shaft 10. The saw blade 15 is mounted in the motor mount 13 and rotatable by the motor 12 to cut the workpiece.

Figure 10:
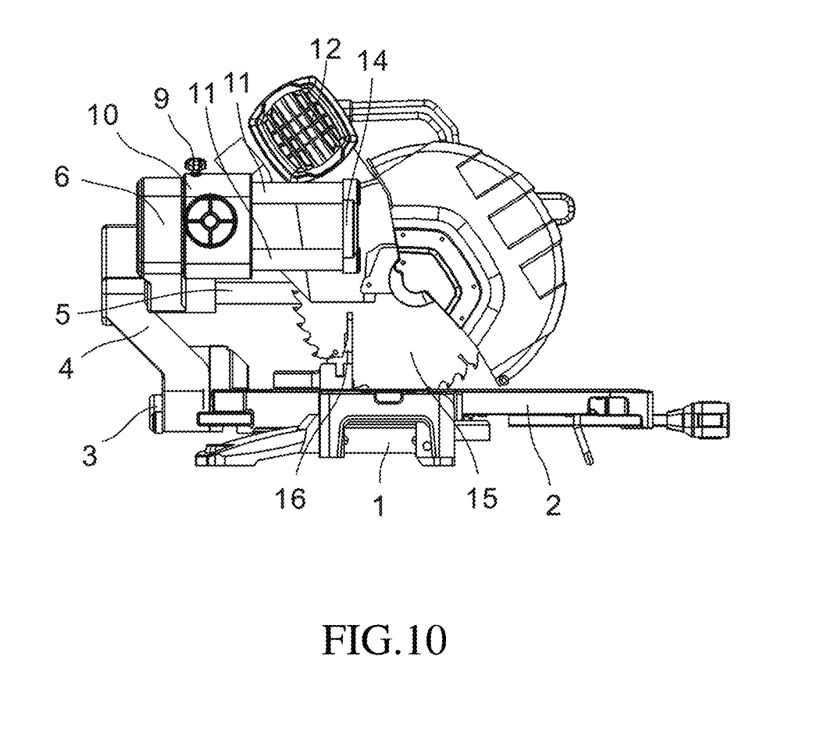
FIG. 10 corresponds to FIG. 6, illustrating the electric mitre saw on the minimum sliding stroke status.
Figure 11:
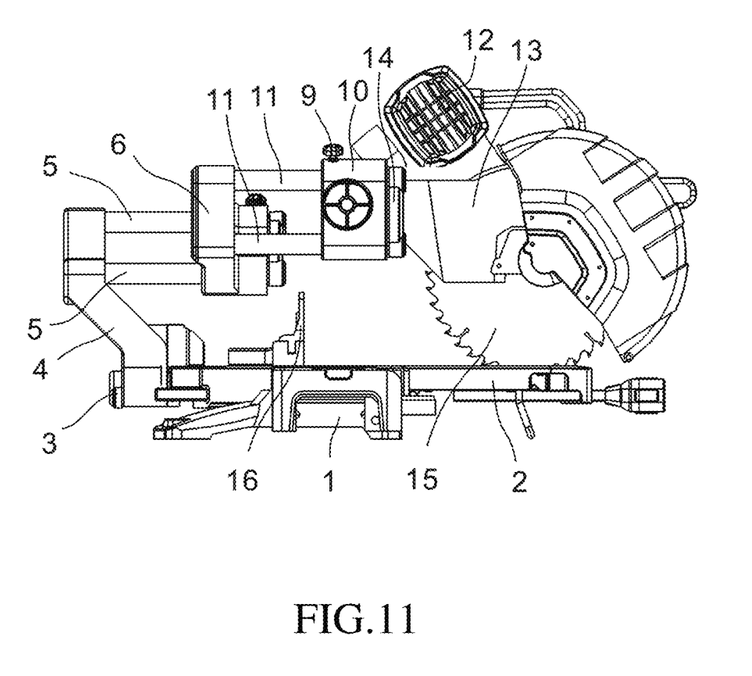
FIG. 11 corresponds to FIG. 6, illustrating the electric mitre saw on the maximum sliding stroke status.

The first-layer guide rods 5 and the second-layer guide rods 11 are respectively arranged at two opposite lateral sides relative to the saw blade 15 without interfering with the cutting operation of the saw blade 15. The front ends of the first-layer guide rods 5 and the front ends of the second-layer guide rods 11 are respectively connected together by a first-layer connection member 8 and a second-layer connection member 14, maintaining guide rod stability, assuring a high level of parallelity, facilitating fabrication and installation. Thus, the guide rods can be made relatively longer to provide a larger cutting stroke. As illustrated in FIGS. 10 and 11, under the same cutting stroke, the length of each layer of guide rods can be minimized, lowering the fabrication difficulty. Further, the first-layer connection member 8 and the second-layer connection member 14 can limit the sliding stroke of the sliding block 6 and the rotating shaft 10, prohibiting the sliding block 6 and the rotating shaft 10 from falling out of the guide rods during movement. If the second-layer guide rods 11 and the sliding block 6 are made movable relative to each other, a connection member or position-limit member should be provided at the rear ends of the second-layer guide rods 11.

Figure 7:
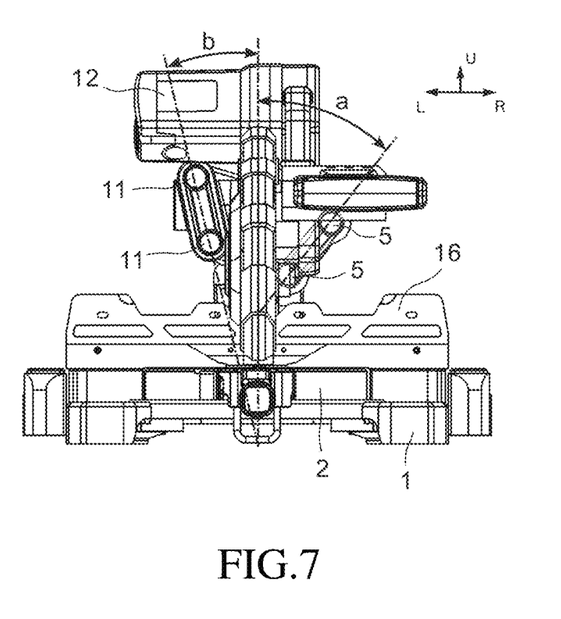
FIG. 7 is a front view of the electric mitre saw in accordance with the second embodiment of the present invention.
Figure 8:
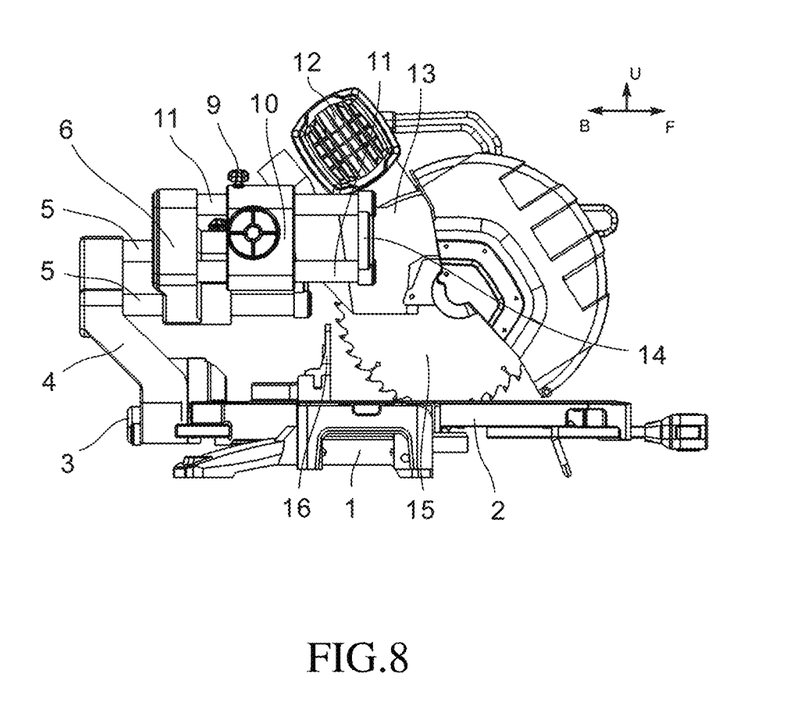
FIG. 8 is a left side view of FIG. 7.
Figure 9:
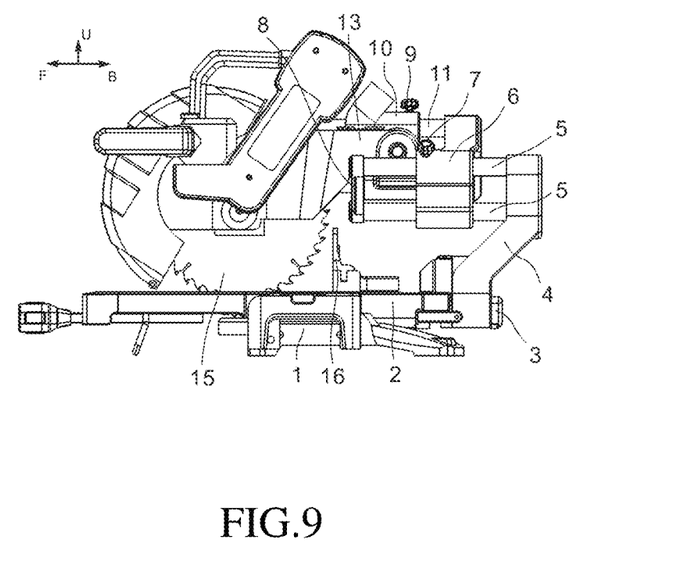
FIG. 9 is a right side view of FIG. 7.

As illustrated in FIG. 7, the two first-layer guide rods 5 are disposed at the right side R relative to the saw blade 15; the two second-layer guide rods 11 are disposed at the left side L relative to the saw blade 15; the space defined between the two first-layer guide rods 5 and the two second-layer guide rods 11 is adapted for receiving the saw blade 15, the rotating shaft 10 and the motor mount 13, enabling them to be moved to cut the workpiece. Because the guide rods and the saw unit do not interfere with each other, therefore, as shown in FIG. 5, the saw unit can be retracted along the guide rods and stopped at the rear side of the swinging arm 4. At this time, the guide rods will not extend out of the swinging arm 4 in the backward direction B, and the working space of the electric mitre saw is minimized, reducing the packing dimension of the electric mitre saw.

Preferably, as shown in FIG. 7, the plane on the center lines of the two first-layer guide rods 5 defines with the plane of the saw blade 15 a predetermined contained angle a and the plane on the center lines of the two second-layer guide rods 1 defines with the plane of the saw blade 15 a predetermined contained angle b, and therefore a substantially V-shaped retaining space is defined between the two first-layer guide rods 5 and the two second-layer guide rods 1 wherein the relatively larger side of the V-shaped opening faces upwards for the passing of the motor mount 13 and the rotating shaft 10; the relatively smaller side of the V-shaped opening faces downwardly toward the worktable 2 for the passing of the saw blade 15; the motor 12 is disposed above the guide rods without interfering with the movement of the guide rods. Further, the first-layer guide rods 5 and the second-layer guide rods 11 are obliquely downwardly arranged to have the relatively smaller side of the V-shaped opening face toward the worktable 2 so that the first-layer guide rods 5 and the second-layer guide rods 11 can be biased with the swinging arm 4 relative to the worktable 2 without interfering with the fence 16, and thus, the space above the base 1 can be fully utilized. Therefore, the electric mitre saw has a compact structure. Preferably, the plane on the center lines of the first-layer guide rods 5 and the plane on the second-layer guide rods 11 are obliquely arranged in an asymmetric manner, and the second-layer guide rods 11 are disposed above the elevation of the first-layer guide rods 5, i.e., the contained angle between the second-layer guide rods 11 and the saw blade 15 is smaller than the contained angle between the first-layer guide rods 5 and the saw blade 15. Alternatively, the second-layer guide rods 11 can be disposed at a location relative to the worktable 2 farther than the first-layer guide rods 5 to have the center of gravity of each of the two structures at the two opposite lateral sides relative to the saw blade 15 be kept in balance, providing a relatively larger viewing range, enhancing cutting stability, and avoiding turnover.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electric mitre saw, comprising:
   a base;
   a worktable rotatably connected to said base;
   a saw unit disposed above said worktable and movable forward and backward relative to said worktable, said saw unit comprising a motor, a planar saw blade rotatable by said motor, and a motor mount;
   a swing arm pivotally mounted at a rear side of said worktable;
   wherein a swinging arm guide rod means mounted therein, said guide rod means comprising multiple layers of guide rods respectively horizontally movable forward and backward relative to said swinging arm, each of two adjacent said layers of guide rods being coupled together by a sliding block and movable relative to each other, the farthest layer of guide rods remote from said swinging arm has a rotating shaft mounted therein; said saw unit is pivotally connected to said rotating shaft;
   said guide rod means comprises at least two first-layer guide rods horizontally mounted to slide in a direction parallel with said worktable in said swinging arm at one lateral side relative to said saw blade, said first-layer guide rods defining a plane through the central axes of the first-layer guide rods which intersects said planar saw blade at a first acute angle;
   said sliding block slidably coupled to said at least two first-layer guide rods and lockable thereto said guide rod means further comprises at least two second-layer guide rods horizontally coupled to said sliding block at an opposite lateral side relative to said saw blade each rod having a parallel central axis relative to said at least two first-layer guide rods; and said second-layer guide rods defining a plane through the central axes of the second layer guide rods which intersects said planar saw blade at a second acute angle; said rotating shaft is mounted at said at least one second-layer guide rod; said saw unit is pivotally connected to said rotating shaft; said at least two first-layer guide rods and said at least two second-layer guide rods define therebetween a space for the passing of said saw blade.

2. The electric mitre saw as claimed in claim 1, wherein said at least two first layer guide rods are fixedly mounted at said swinging arm and disposed at one lateral side relative to said saw blade.

3. The electric mitre saw as claimed in claim 1, wherein said at least two first layer guide rods are slidably mounted at said swinging arm and disposed at one lateral side relative to said saw blade.

4. The electric mitre saw as claimed in claim 3, wherein said sliding block is selectively slidably mounted to at least one first-layer guide rod, or fixedly mounted at one end of said at least one first-layer guide rod.

5. The electric mitre saw as claimed in claim 1, wherein said at least two second layer guide rods are fixedly mounted at said swinging arm and disposed at an opposite lateral side relative to said saw blade; said rotating shaft is pivotally mounted at said at least one second-layer guide rod; said saw unit is slidable relative to said at least two second layer guide rods.

6. The electric mitre saw as claimed in claim 1, wherein said at least two second layer guide rods are slidably mounted at said swinging arm and disposed at an opposite lateral side relative to said saw blade; said rotating shaft is selectively affixed or slidably coupled to said at least one second-layer guide rod, enabling said saw unit to be moved with said at least one second-layer guide rod relative to said sliding block or moved relative to said at least two second layer guide rods.

7. The electric mitre saw as claimed in claim 1, wherein the guide rod amount of each layer of said guide rod means is selectively 2, or more then 2.

8. The electric mitre saw as claimed in claim 7, wherein; the two said first-layer guide rods have respective rear ends thereof connected together with a respective connection member; the two said second-layer guide rods have respective rear ends thereof connected together with a respective connection member.

9. The electric mitre saw as claimed in claim 1, wherein said swinging arm, said sliding block and said rotating shaft are respectively provided with a respective lock means for locking.

10. The electric mitre saw as claimed in claim 9, wherein each said lock means is a lock screw, said lock screw having one end thereof tightly stoppable against one said guide rod.

11. The electric mitre saw as claimed in claim 9, wherein each said lock means is a lock pin selectively insertable into one of a series of holes at one side guide rod.

12. The electric mitre saw as claimed in claim 1, wherein the guide rods of said multiple layers of guide rods are selectively made in equal length or different lengths.

13. The electric mitre saw as claimed in claim 1, wherein the guide rods of said multiple layers of guide rods are round rods.

14. The electric mitre saw as claimed in claim 1, wherein the guide rods of said multiple layers of guide rods are linear guide rods having notches or protrusions.

* * * * *